US010054076B1

(12) United States Patent
McFarland

(10) Patent No.: US 10,054,076 B1
(45) Date of Patent: Aug. 21, 2018

(54) BAROMETRIC PRESSURE COMPENSATED FUEL PRESSURE CONTROL SYSTEM

(71) Applicant: Delphi Technologies IP Limited, St. Michael OT (BB)

(72) Inventor: Bernard M. McFarland, Warren, IN (US)

(73) Assignee: DELPHI TECHNOLOGIES IP LIMITED (BB)

( * ) Notice: Subject to any disclaimer, the term of this patent is extended or adjusted under 35 U.S.C. 154(b) by 14 days.

(21) Appl. No.: 15/427,750

(22) Filed: Feb. 8, 2017

(51) Int. Cl.
*F02D 41/00* (2006.01)
*F02D 41/30* (2006.01)

(52) U.S. Cl.
CPC .... *F02D 41/3082* (2013.01); *F02D 2200/703* (2013.01)

(58) Field of Classification Search
CPC ............. F02D 41/3836; F02D 41/3082; F02D 2200/703
See application file for complete search history.

(56) References Cited

U.S. PATENT DOCUMENTS

| 5,957,107 A * | 9/1999 | Kadota ................... F02D 37/02 123/179.16 |
| 6,196,203 B1 | 3/2001 | Grieve et al. |
| 2003/0131832 A1* | 7/2003 | Matsumoto ............. F02D 41/32 123/677 |
| 2003/0213294 A1* | 11/2003 | Date ..................... F02D 41/222 73/114.45 |
| 2004/0065147 A1* | 4/2004 | Mitani .................. F02M 37/106 73/149 |
| 2007/0235009 A1* | 10/2007 | Nakashima ........... F02D 41/047 123/458 |
| 2008/0041645 A1 | 2/2008 | Bauerle |
| 2008/0154485 A1* | 6/2008 | Yasuda .................... F01N 3/101 701/113 |
| 2009/0093943 A1* | 4/2009 | Hirowatari .......... F02D 41/3836 701/103 |
| 2012/0291747 A1* | 11/2012 | Jurjevec .................. F01L 1/185 123/294 |

(Continued)

*Primary Examiner* — Hieu T Vo
*Assistant Examiner* — Sherman Manley
(74) *Attorney, Agent, or Firm* — Joshua M. Haines

(57) ABSTRACT

A system to control fuel-pressure of fuel delivered to a fuel-injector includes a fuel-pump, an absolute-pressure-sensor, a pressure-regulator, and a controller. The fuel-pump is operable to vary fuel-pressure of fuel output by the fuel-pump. The absolute-pressure-sensor indicates an absolute-pressure of the fuel. The pressure-regulator limits the fuel-pressure by releasing fuel output by the fuel-pump when the fuel-pressure exceeds a tank-pressure of the fuel-tank by a pressure-threshold. The controller is in communication with the absolute-pressure-sensor and the fuel-pump. The controller periodically operates the fuel-pump in a test-mode where the fuel-pressure is such that the pressure-regulator releases fuel output by the fuel-pump, estimates a barometric-pressure outside of the fuel-tank based on the absolute-pressure while the pressure-regulator is releasing fuel output by the fuel-pump into the fuel-tank, and operates the fuel-pump in a normal-mode where the fuel-pressure is controlled so the absolute-pressure corresponds to a desired-pressure that is determined based on the barometric-pressure.

2 Claims, 2 Drawing Sheets

(56) References Cited

U.S. PATENT DOCUMENTS

| | | |
|---|---|---|
| 2014/0074385 A1 | 3/2014 | Dudar et al. |
| 2014/0114550 A1 | 4/2014 | Bohr et al. |
| 2014/0277927 A1 | 9/2014 | Guo et al. |
| 2014/0297071 A1 | 10/2014 | Dudar et al. |
| 2016/0281630 A1* | 9/2016 | Rockwell ............... F02M 37/08 |

* cited by examiner

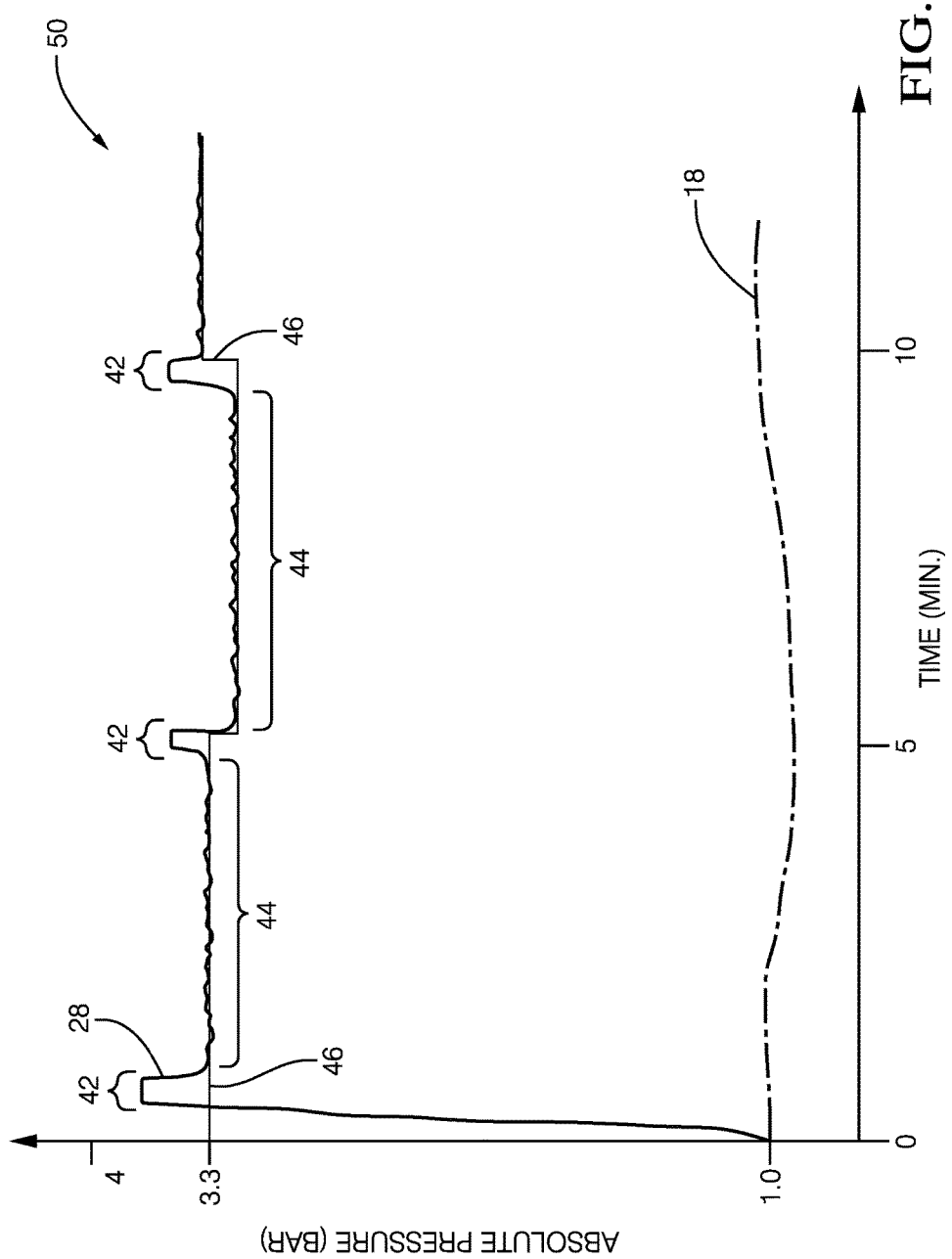

BAROMETRIC PRESSURE COMPENSATED FUEL PRESSURE CONTROL SYSTEM

TECHNICAL FIELD OF INVENTION

This disclosure generally relates to a system to control the fuel-pressure of fuel delivered to a fuel-injector, and more particularly relates to a system that estimates the barometric-pressure of the atmosphere outside of a fuel-tank based on the absolute-pressure of fuel while a pressure-regulator is releasing into the fuel-tank fuel output by a fuel-pump.

BACKGROUND OF INVENTION

It is known that some fuel systems measure the pressure of fuel in absolute-pressure. This absolute-pressure is typically controlled by a controller (e.g. Engine Control Module or ECM) to a desired-pressure, and the controller adjusts the desired pressure for changes in barometric-pressure based on a reading from a barometric-pressure sensor. Adjusting the desired-pressure for changes in barometric pressure is desirable to maintain consistency of the amount of fuel delivered by an injector operated at a predetermined pulse-width. However, providing the barometric-pressure sensor undesirably increases system cost. Alternatively, a relative or gauge-pressure sensor may be used to compensate for changes in barometric pressure. However, problems arise when a gauge-pressure sensor is mounted in an under-the-vehicle environment near the fuel-pump as clogging of the sensor's vent port can affect the readings.

SUMMARY OF THE INVENTION

In accordance with one embodiment, a system to control fuel-pressure of fuel delivered to a fuel-injector is provided. The system includes a fuel-pump, an absolute-pressure-sensor, a pressure-regulator, and a controller. The fuel-pump is operable to vary fuel-pressure of fuel output by the fuel-pump. The absolute-pressure-sensor indicates an absolute-pressure of the fuel. The pressure-regulator limits the fuel-pressure by releasing fuel output by the fuel-pump into a fuel-tank when the fuel-pressure exceeds a tank-pressure of the fuel-tank by a pressure-threshold. The controller is in communication with the absolute-pressure-sensor and the fuel-pump. The controller periodically operates the fuel-pump in a test-mode where the fuel-pressure is such that the pressure-regulator releases fuel output by the fuel-pump, estimates a barometric-pressure outside of the fuel-tank based on the absolute-pressure while the pressure-regulator is releasing fuel output by the fuel-pump into the fuel-tank, and operates the fuel-pump in a normal-mode where the fuel-pressure is controlled so the absolute-pressure corresponds to a desired-pressure that is determined based on the barometric-pressure.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 2 is graph of data present in the system of FIG. 1 in accordance with one embodiment.

DETAILED DESCRIPTION

Figure 1:
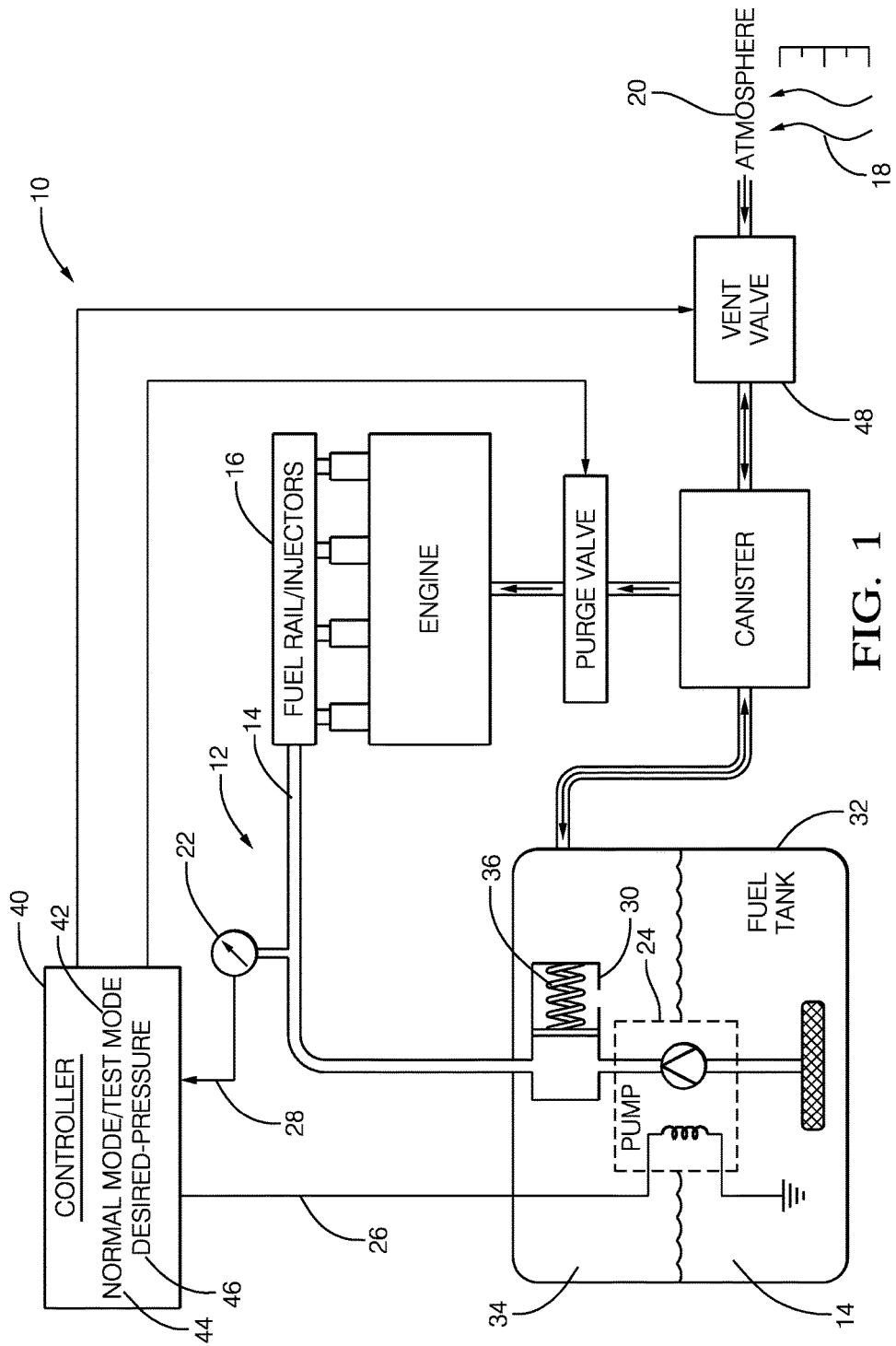
FIG. 1 is diagram of a fuel pressure control system in accordance with one embodiment.

FIG. 1 illustrates a non-limiting example of a system 10 that controls the fuel-pressure 12 of fuel 14 delivered to a fuel-injector 16. As will become apparent in the description that follows, the system 10 described herein is advantageous over prior fuel control systems because the system 10 compensates for changes in barometric-pressure 18 of the ambient atmosphere 20 outside of the system 10 using only an absolute-pressure-sensor 22, i.e. without relying on a barometric-pressure sensor or a gauge-pressure sensor.

The system 10 includes a fuel-pump 24 that is operable to vary the fuel-pressure 12 of the fuel 14 output by the fuel-pump 24. As will be recognized by those in the art, the fuel-pressure 12 can be varied by applying a variable pulse-width-modulated signal 26 (PWM-signal 26) to the fuel-pump 24.

The system 10 also includes the absolute-pressure-sensor 22 that indicates an absolute-pressure 28 of the fuel 14. That is, the absolute-pressure 28 indicated by the absolute-pressure-sensor 22 is not a value relative to the barometric-pressure 18, but rather to some fixed absolute value such as zero or a fixed value such as one atmosphere.

The system 10 also includes a pressure-regulator 30 that limits the fuel-pressure 12 by releasing the fuel 14 output by the fuel-pump 24 into a fuel-tank 32 when the fuel-pressure 12 exceeds a tank-pressure 34 of the fuel-tank 32 by a pressure-threshold 36. By way of example and not limitation, the pressure-threshold 36 may be three bar (3 bar or about 43.5 psi). If the tank-pressure 34 is one bar (1 bar), then the fuel pressure 12 at the pressure-regulator 30 will be limited to four bar (4 bar). In this non-limiting example the pressure-threshold is determined by a spring and orifice arrangement of the pressure-regulator 30, but it is recognized that other configurations are possible.

The system 10 also includes a controller 40 in communication with the absolute-pressure-sensor 22 so as to receive the absolute-pressure 28, and the fuel-pump 24 so as to provide the PWM-signal 26. The controller 40 may include a processor (not specifically shown) such as a microprocessor or other control circuitry such as analog and/or digital control circuitry including an application specific integrated circuit (ASIC) for processing data as should be evident to those in the art. The controller 40 may include memory (not specifically shown), including non-volatile memory, such as electrically erasable programmable read-only memory (EEPROM) for storing one or more routines, thresholds, and captured data. The one or more routines may be executed by the processor to perform steps for determining or generating the PWM-signal 26 based on signals received by the controller 40 from, but not limited to, the absolute-pressure-sensor 22.

When, for example, a vehicle travels to high-altitude in a mountain range, the barometric pressure may decrease and lead to excessive fuel being injected into the engine of the vehicle because the differential pressure of the fuel 14 from the inlet to the outlet of the fuel-injector 16 has increased. In order to compensate for variations in the barometric-pressure 18, the controller 40 is configured or programmed to periodically (e.g. at five minute intervals) operate the fuel-pump 24 in a test-mode 42 where the fuel-pressure 12 is such (i.e. is great enough) that the pressure-regulator 30 releases fuel output by the fuel-pump 24. The activation of the pressure-regulator 30 during test-mode 42 may be caused by an increase of the percent duty-cycle of the PWM-signal 26 to some predetermined value that is known to be sufficient to increase the fuel-pressure 12 to an amount that activates the pressure-regulator 30 to release the fuel 14.

While in the test-mode 42, the controller 40 estimates the barometric-pressure 18 outside of the fuel-tank 32 based on the absolute-pressure 28 indicated by the absolute-pressure-sensor 22 while the pressure-regulator 30 is releasing the fuel 14 output by the fuel-pump 24 into the fuel-tank 32. As will be explained in more detail later, there are several methods by which the relationship between the tank-pressure 34 and the barometric-pressure 18 can be known or controlled.

Once the barometric-pressure 18 is known, the controller 40 is configured or programmed to operate the fuel-pump 24 in a normal-mode 44 where the fuel-pressure 12 is controlled by, for example, varying the percent duty-cycle of the PWM-signal 26 so the absolute-pressure 28 corresponds to a desired-pressure 46 that is determined based on the barometric-pressure 18. For example, if the desired differential pressure of the fuel 14 across the injector 16 is 2.3 bar and the barometric-pressure 18 is 1.0 bar, then the desired-pressure is determined to be 3.3 bar. The controller 40 then operates the fuel-pump 24 by varying the percent duty-cycle of the PWM-signal 26 so the absolute-pressure 26 corresponds to (i.e. is equal to) the desired-pressure 46. However if at some later time the periodic operation in the test-mode 42 indicates that the barometric-pressure 18 has decreased to 0.8 bar, then the desired-pressure 46 is changed to 3.1 bar and the fuel-pump is operated so the absolute-pressure corresponds to 3.1 bar.

FIG. 2 illustrates a non-limiting example of a graph 50 of data present in the system 10 over time. When the system 10 is initiated at time=0 minutes, the fuel-pump 24 is operated so the pressure-regulator 30 is activated and the absolute-pressure is limited to about 4 bar which indicates that the barometric pressure is about 1 bar. The desired-pressure 46 is then set to 3.3 bar as suggested above, and the normal-mode 44 is engaged to operate the fuel-pump 24 so the absolute-pressure 28 is controlled to the desired-pressure 46. At time=5 minutes the test-mode 42 is again activated and the decrease in the barometric-pressure 18 is determined. As a result the desired-pressure is reduced, which correspondingly reduces the absolute-pressure 28 when the system 10 operates in the normal-mode 44. At time=10 minutes the test-mode 42 is again engaged and the increase in barometric-pressure 18 is detected so the desired-pressure 46 is increased.

The five-minute intervals between occurrences of operating in the test-mode 42 are merely a suggestion, and is it recognized that other events rather than simply the passage of time may be used to determine that the test-mode 42 should be executed. For example, if a shift in fueling error is detected by the closed-loop fuel control of the engine, the test-mode 42 may be executed to determine if the shift is due to a change in the barometric-pressure.

To control the tank-pressure 34 to be known with respect to the barometric-pressure 18, the system 10 may include a vent-valve 48 that couples the fuel-tank 32 to the barometric-pressure 18 during the test-mode 42. Most vehicles are equipped with evaporative emissions controls that include a canister that captures fuel vapors, and a purge-valve that controls the consumption of those vapors by the engine. If the vent-valve 48 is opened and the purge-valve is closed, the tank-pressure 34 will be essentially equal to the barometric-pressure 18.

Accordingly, a system 10 to control fuel-pressure of fuel delivered to a fuel-injector, a controller 40 for the system 10, and a method of operating the system 10 is provided. The system 10 provides for barometric-pressure compensation of the fuel-pressure 12 without having to provide a separate barometric-pressure sensor or a relative or gauge-pressure sensor which have been observed to have problems if the vent for the gauge-pressure sensor becomes dirty or otherwise blocked.

While this invention has been described in terms of the preferred embodiments thereof, it is not intended to be so limited, but rather only to the extent set forth in the claims that follow.

I claim:

1. A system to control fuel-pressure of fuel delivered to a fuel-injector, said system comprising:

a fuel-pump operable to vary fuel-pressure of fuel output by the fuel-pump;

an absolute-pressure-sensor that indicates an absolute-pressure of the fuel;

a pressure-regulator that limits the fuel-pressure by releasing fuel output by the fuel-pump into a fuel-tank when the fuel-pressure exceeds a tank-pressure of the fuel-tank by a pressure-threshold;

a controller in communication with the absolute-pressure-sensor and the fuel-pump, wherein the controller periodically operates the fuel-pump in a test-mode where the fuel-pressure is such that the pressure-regulator releases fuel output by the fuel-pump, estimates a barometric-pressure outside of the fuel-tank based on the absolute-pressure while the pressure-regulator is releasing fuel output by the fuel-pump into the fuel-tank, and operates the fuel-pump in a normal-mode where the fuel-pressure is controlled so the absolute-pressure corresponds to a desired-pressure that is determined based on the barometric-pressure.

2. The system in accordance with claim 1, wherein the system includes a vent-valve that couples the fuel-tank to the barometric-pressure during the test-mode.

* * * * *